(12) United States Patent
Wako

(10) Patent No.: US 7,737,987 B2
(45) Date of Patent: Jun. 15, 2010

(54) DISPLAY METHOD AND APPARATUS FOR ADJUSTING CONTRAST OF MAP ELEMENTS FOR NAVIGATION SYSTEM

(75) Inventor: Hikaru Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 543 days.

(21) Appl. No.: 11/729,551

(22) Filed: Mar. 29, 2007

(65) Prior Publication Data

US 2008/0238933 A1 Oct. 2, 2008

(51) Int. Cl.
*G09G 5/00* (2006.01)
*G01C 21/00* (2006.01)
*G01C 21/30* (2006.01)

(52) U.S. Cl. .................. 345/581; 345/617; 701/200; 701/208

(58) Field of Classification Search .................. 345/617, 345/518; 1/200, 208
See application file for complete search history.

(56) References Cited

U.S. PATENT DOCUMENTS 6,434,481 B2 * 8/2002 Winter et al. ................ 701/208

2003/0028294 A1 * 2/2003 Yanagi ........................ 701/21
2005/0182560 A1 * 8/2005 Cochlovius et al. ......... 701/208

FOREIGN PATENT DOCUMENTS

JP 2006-3005 2/2006
WO WO 03/107312 12/2003

* cited by examiner

*Primary Examiner*—Chante Harrison
(74) *Attorney, Agent, or Firm*—Muramatsu & Associates

(57) ABSTRACT

A method and apparatus of valuing contrast of representation on background displayed on a screen of a navigation apparatus, by counting a number of the presentations on the background of the screen, adjusting contrast of the representations against the background displayed on the screen in response to the number of the representation on the background, and displaying the representations on the screen based on the adjusted contrast of the representation. The contrast of the representations against the background is set lower than original contrast against the background when the number of the representations is equal to or more than a predetermined number. The contrast of the representations is set higher than current contrast when the number of the representations on the screen is less than a predetermined number.

20 Claims, 13 Drawing Sheets

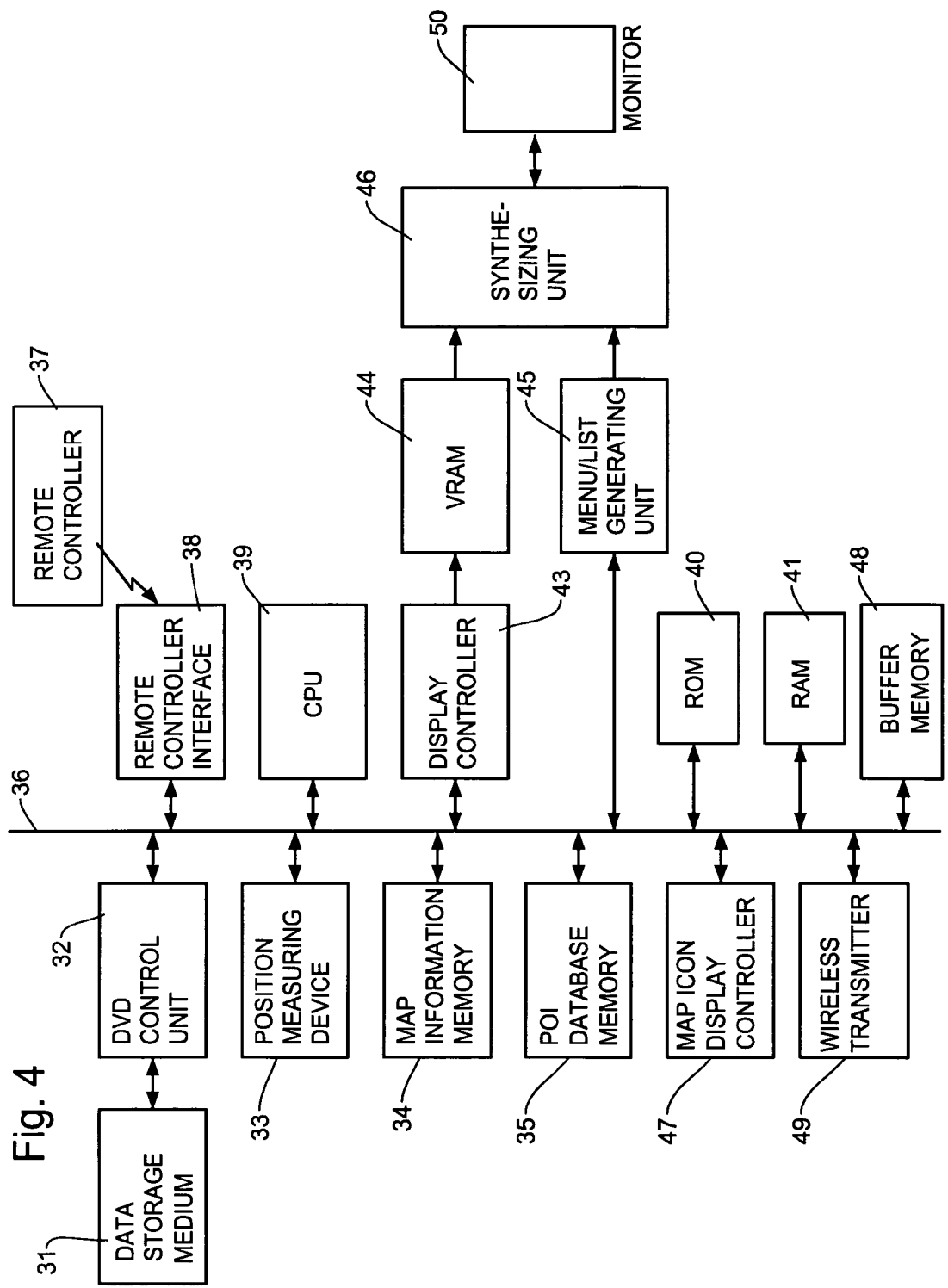

| LONGITUDE/ LATITUDE | POI ICON RECORD | NAME OF ADJACENT ROAD | LINK (NODES N1 AND N2) | CATEGORY | NAME |
|---|---|---|---|---|---|
| (x1, y1) | R | ABC AVE | — — — — | RESTAURANT | BBB RESTAU -RANT |
| | | — — — | — — — | | |

Fig. 8C

DETAILED INFORMATION LIST

| ADDRESS |
| TEL NO. |
| OPENING TIME CLOSING TIME |
| CUISINE / MENU |
| ...... |

Fig. 8B

RESTAURANT LIST

| AAA RESTAURANT |
| BBB RESTAURANT |
| ...... |

Fig. 8A

CATEGORY LIST

| ATM |
| BANK |
| GASOLINE STATION |
| HOTEL |
| PARKING LOT |
| RESTAURANT |
| HOSPITAL |
| SHOPPING |
| ...... |

Same function class displayed in same scale but different contrast.

DISPLAY METHOD AND APPARATUS FOR ADJUSTING CONTRAST OF MAP ELEMENTS FOR NAVIGATION SYSTEM

FIELD OF THE INVENTION

This invention relates generally to a method and apparatus for valuing representation contrast for a navigation apparatus, and more particularly, to a method and apparatus for evaluating representation contrast of map image for a navigation system and adjusting the contrast of representations, such as building images, roads, POI icons, traffic icons, etc., against background color to make a current position and road networks more visible in a congested area and to make minor streets more visible in an open or less congested area on a monitor screen.

BACKGROUND OF THE INVENTION

A navigation system provides travel guidance for enabling a user to easily and quickly reach the selected destination. A typical example is a vehicle navigation system in which a vehicle is equipped with a navigation function to guide a driver to a destination through a calculated route. Such a navigation system detects the position of the user's vehicle, and reads out map data pertaining to an area at the current vehicle position from a data storage medium. Typically, the navigation apparatus displays a map image on a monitor screen while superimposing thereon a mark representing the current vehicle position and a calculated route to the destination. At an intersection associated with the calculated route, the navigation apparatus notifies the user which direction to turn at the intersection to reach the destination.

FIG. 1 shows an example of map image displayed on a monitor screen of the navigation system which shows a map of a congested area such as a downtown of a city. Typically, the navigation system displays a street on which the vehicle (vehicle position VP) is running on a map image and a name of the street. Other information such as a north pointer, a cursor at the center, a map scale, a current time, etc. may also be illustrated on the display screen.

In the example of FIG. 1, buildings and other landmarks are illustrated in a three-dimensional manner in the map image to give the driver an intuitive view of the surrounding area in the city. In addition to the roads and buildings, the, map image includes a large number of POI icons indicating points of interest such as restaurants, ATMs, gas stations, and some other footprints of structure. The roads include large scale roads such as interstate freeways, and small scale roads such as local roads.

As can be seen from FIG. 1, the map image of downtown area includes so many representations of map elements, i.e., different icons (building images, POI icons, traffic icons, etc.) and colors. As a result, too many colors make more important information, such as the current vehicle position, road network and traffic condition less visible. If the driver tries to read or otherwise detect desired information from the complicated map image on the monitor screen, it may distract his attention from the safe driving.

FIGS. 2A-2B and 3A-3B are examples of map image on the screen showing different road widths and colors depending on their function (road) classes specified in a map database. These examples show side-by-side comparison of map images for an urban area (downtown area) with an open area (local area) in the conventional technology. The display method of FIGS. 2A-2B and 3A-3B visually allows the user to confirm what kind of street where he/she is on, especially in a downtown area where several classes of roads exist in a relatively small area.

For example, a freeway is displayed in a symbol having a 5-pixel width in red color; a major surface street is displayed in a symbol having a 5-pixel width in brown color; a surface street is displayed in a symbol having a 4-pixel width in white color; and a minor surface street is displayed in a symbol having a 2-pixel width in light gray color, and the like. According to this method, freeways are more visible than minor surface streets as shown in FIGS. 2A and 3A. However, when this method is applied to an open area such as a country side in the same scale and color as illustrated in FIGS. 2B and 3B, the driver may not really be able to see the minor streets. It may give a feeling that he/she is driving in a desert.

In order to solve the problems described above, several attempts have been made. Japanese Utility Model No. H7-29410 discloses the method for valuing the landmarks on map data by determining the number of the landmarks on a screen and limiting the number of landmarks to be displayed when the number of landmarks is equal to or more than a predetermined number. However, because this method simply limits the landmarks by the number, sometimes it may have to limit important landmarks.

Japanese Patent Application Laid-Open No. 2006-3005 discloses a navigation apparatus having display control means for displaying facility icons, such as restaurants, drug stores and gasoline stations on map data by stop displaying the facility icons when the number of facility icons are more than a predetermined umber. Again, because this method simply limits the facility icons by the number, important facility icons have to be eliminated even though it is important for the user.

International Application Publication No. WO30/107312 discloses a method for representing a selected map extract on a display of a driver information system. A color or a gray value of the map information, especially of a road, is adapted to the color of the map background with a limited maximum color contrast. However, when the number of icons displayed on a screen increases, many icons on the screen make the vehicle position and road network less visible.

SUMMARY OF THE INVENTION

It is, therefore, an object of the present invention to provide a method and apparatus for evaluating representation contrast of a navigation system to achieve various contrasts of representations, such as building images, landmark icons, POI icons, one-way icons and streets, against the background to make a vehicle position and road networks more visible in a congested area.

It is another object of the present invention to provide a method and apparatus for evaluating representation contrast for the navigation system to achieve various contrasts of representations to make minor streets more visible in an open or less congested area.

One aspect of the present invention is a display method for valuing contrast of representations on the background displayed on a screen of a navigation system. The method includes the step of: counting a number of the representations on the background of the screen, adjusting contrast of the representations against the background displayed on the screen in response to the number of the representation on the background, and displaying the representations on the screen based on the adjusted contrast of the representation adjusted.

The contrast of the representations against the background is set lower than the original contrast of the representations against the background when the number of the representations on the screen is equal to or larger than a predetermined number.

The contrast of the representations against the background is set higher than current contrast of the representations against the background when the number of the representations on the screen is smaller than a predetermined number.

The contrast of the representations against the background is set so as to change the contrast of the representations against the background in a stepwise increment or decrement in response to the number of the representations.

Another aspect of the present invention is a display method for valuing contrast of representations on background displayed on a screen of a navigation system. The method includes the step of: counting a number of the representations on the background of the screen, adjusting contrast of the representations against the background displayed on the screen in response to the number of the representation on the background, and displaying the representations on the screen based on the adjusted contrast of the representation. The representations include a first street and a second street on the background displayed on the screen of the navigation apparatus, and the contrast of the first street against the background color is adjusted to lower contrast than the contrast of the second street against the background when the number of the representations in the screen is equal to or larger than a predetermined number.

The contrast of the first street against the background color is adjusted to the same contrast as the contrast of the second street against the background when the number of the representations in the screen is smaller than a predetermined number.

Another aspect of the present invention is a display apparatus for a navigation system for evaluating contrast of representations on the background displayed on a screen of the navigation system. The navigation system includes means for counting a number of the representations on the background of the screen, means for adjusting the contrast of the representations against the background displayed on the screen in response to the number of the representation on the background, and means for displaying the representations on the screen based on the adjusted contrast of the representation.

According to the present invention, the navigation system evaluates the representations of map elements and adjusts the contrast of the representations based on various factors. Thus, the navigation system allows a user to more easily and accurately identify the actual locations of the map elements, such as a destination, road networks, road level, etc., in a congested area by adjusting the representation contrast. Accordingly, the navigation system is able to provide various contrast of icons, such as building images, landmark icons, POI icons, traffic icons such as one-way icons, and roads, against the background color on the screen. Further, it becomes possible to make the minor streets more visible in an open or less congested area by adjusting the contrast of the minor street against the background on the screen of the navigation system.

BRIEF DESCRIPTION OF THE DRAWINGS

FIG. 2A shows an urban or crowded area and FIG. 2B shows an open or less crowded area.

FIG. 3A shows an urban or crowded area and FIG. 3B shows an open or less crowded area.

FIG. 4 is a block diagram showing an example of configuration of a vehicle navigation system for implementing the display method of the present invention.

FIG. 6A shows road links and FIG. 6B shows a polygon.

FIGS. 8A-8C illustrate an example of layered structure of the POI data in the map database for the representations of the POI icons on the screen of the navigation system.

FIG. 12A shows the map image before applying the contrast adjustment operation and FIG. 12B shows the map image after applying the contrast adjustment operation.

FIG. 13A shows the map image before applying the contrast adjustment operation and FIG. 13B shows the map image after applying the contrast adjustment operation.

DETAILED DESCRIPTION OF THE PREFERRED EMBODIMENTS

Figure 1:
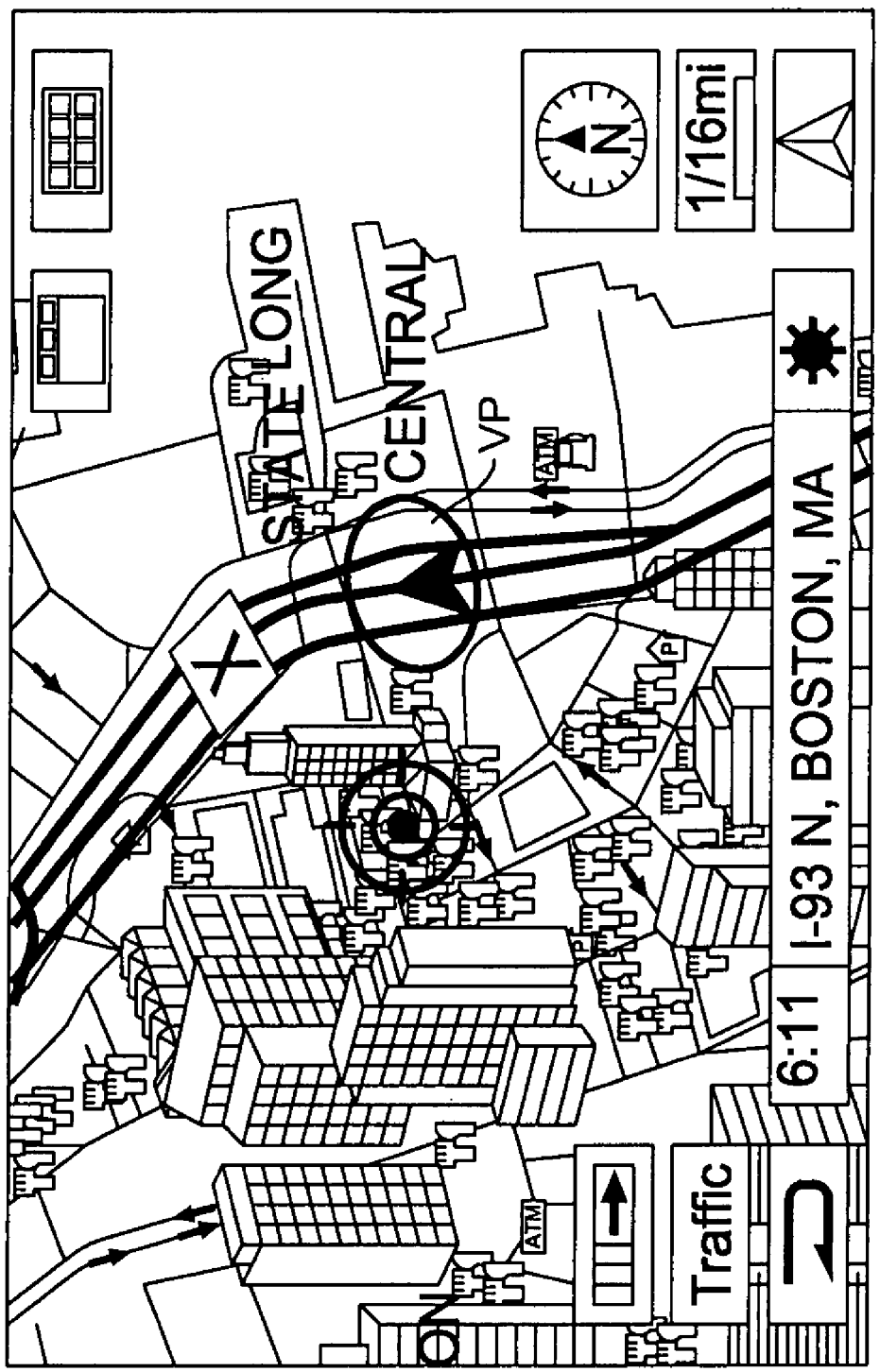
FIG. 1 illustrates a screen in the navigation apparatus including representations, such as a destination mark, a current vehicle position mark, POIs such as large buildings as landmarks, restaurants, ATMs, some other footprints of buildings and streets when a user is driving a vehicle in an urban area.
Figure 2A:
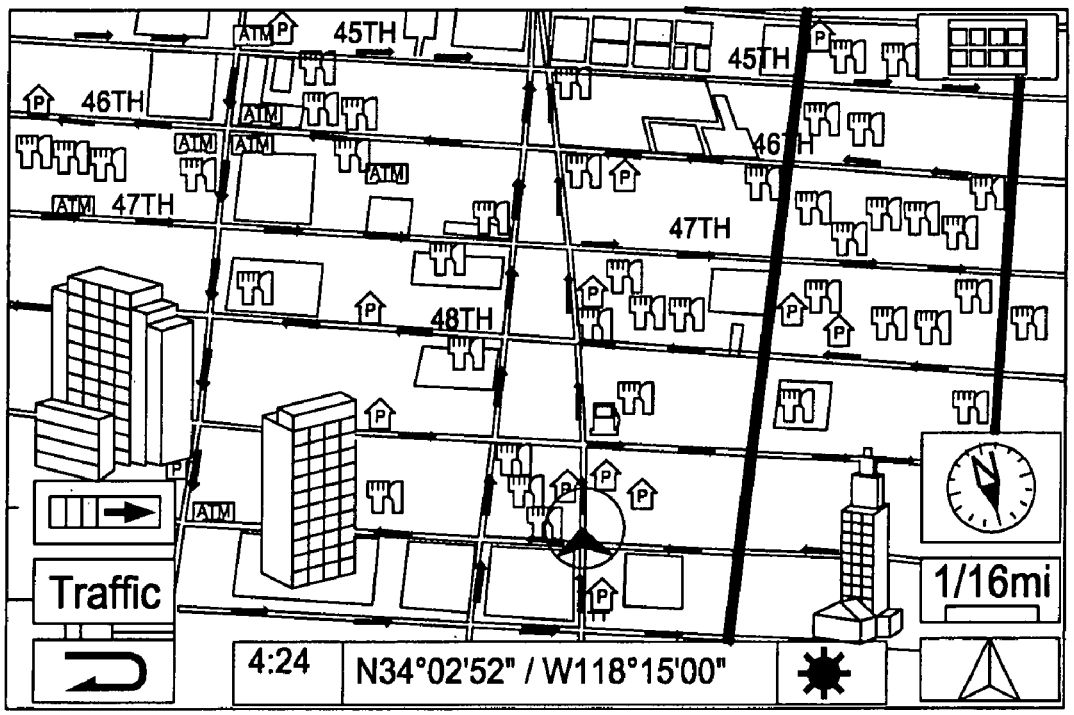
FIGS. 2A and 2B respectively illustrate example of map screens showing different road widths and colors depending on their function classes in the map database where
Figure 2B:
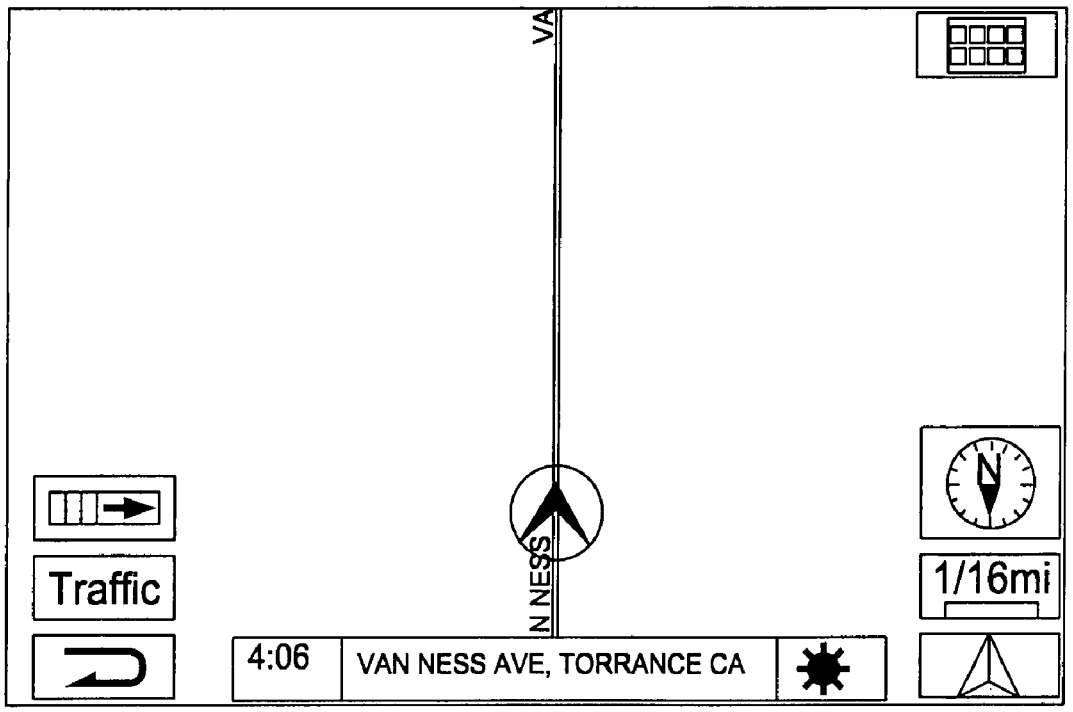
Figure 3A:
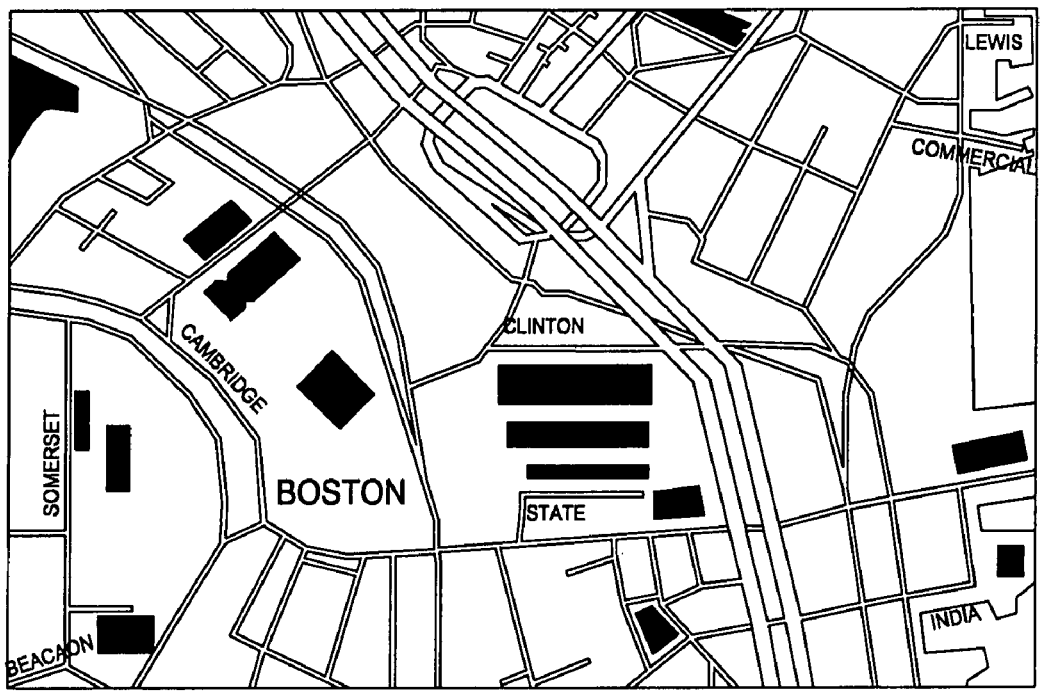
FIGS. 3A and 3B respectively illustrate examples of map screens showing different road widths and colors depending on their function classes in the map database where
Figure 3B:
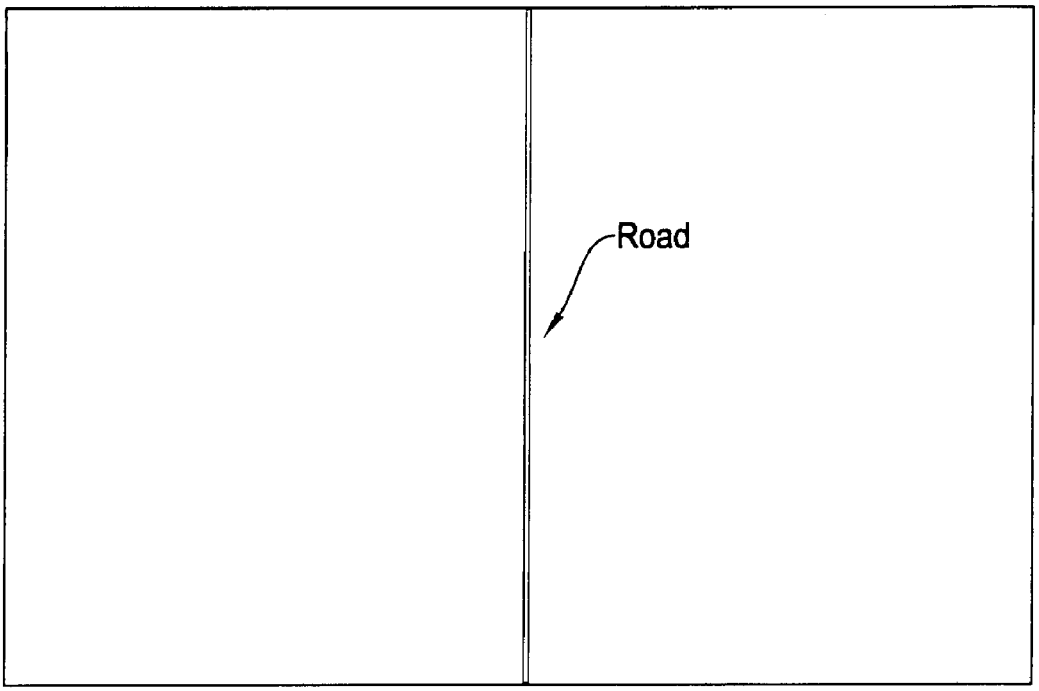

The present invention will be described in detail with reference to the accompanying drawings. In the present invention, the navigation system evaluates the representations of map elements and adjusts the contrast of the representations based on various factors. Thus, the navigation system allows a user to more easily and accurately identify the actual locations of the map elements, such as a destination, road networks, road level, etc., in a congested area by adjusting the representation contrast. Further, the navigation system makes it possible to display minor streets more visible in an open or less congested area by adjusting the contrast of the minor streets against the background on the screen. It should be noted that within the context of the present invention, each map element may also be referred to as "icon".

FIG. 4 shows an example of a structure of a vehicle navigation system for implementing the display method of the present invention. While the vehicle navigation apparatus is explained for an illustration purpose, the present invention can also be applied to other types of navigation apparatus, such as a portable navigation device implemented by a PDA (personal digital assistant) device, other hand-held devices such as a wireless telephone, or a laptop or notebook computer.

In the block diagram, the navigation apparatus includes a data storage medium 31 such as a hard disc, CD-ROM, DVD or other storage means for storing the map data. The navigation apparatus includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from satellites and determining the current position of the vehicle.

The block diagram of FIG. 4 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation and a remote controller interface 38. Although a remote controller is a typical example for selecting menus, executing selected functions and etc., the navigation apparatus includes various other input methods to achieve the same and similar operations done through the remote controller.

In FIG. 4, the navigation apparatus further includes a bus 36 for interfacing the above units in the navigation apparatus, a processor (CPU) 39 for controlling an overall operation of the navigation apparatus, a ROM 40 for storing various control programs such as a contrast valuing program, a route search program and a map matching program necessary for navigation control, a RAM 41 for storing a processing result such as a guide route, a display controller 43 for generating a map image (a map guide image or an arrow guide image) on the basis of the map information, a VRAM 44 for storing images generated by the display controller 43, a menu/list generating unit 45 for generating menu image/various list images, a synthesizing unit 46, a map icon display controller 47, a wireless transmitter 49 for wireless communication to retrieve data from a remote server, a buffer memory 48 for temporally storing data for ease of data processing, and a monitor screen (display) 50.

The map icon display controller 47 controls the operation for displaying map elements (representations) such as, roads, buildings, POI icons, etc. The map icon display controller 47 can be a part of the CPU 39 noted above or a separate processor. The map icon display controller 47 performs a function of the present invention for evaluating the representation contrast against the background color to make a vehicle position and road networks more visible in a congested area and to make minor streets more visible in an open or less congested area.

The map icon display controller 47 reads out POI information from the POI database memory 35 to count the number of icons to be displayed associated with the map information from the map information memory 34 on the monitor screen. The map display controller 47 sets the appropriate contrast against the background color in the area associated with the current vehicle position. The detailed operation of the map icon display controller 47 will be described later.

As noted above, the map icon display controller 47 checks the map information to set the contrast of the map elements. FIGS. 5-8C show examples of data structures in the map database from which the map elements may be selected and their contrast will be adjusted.

Figure 5:
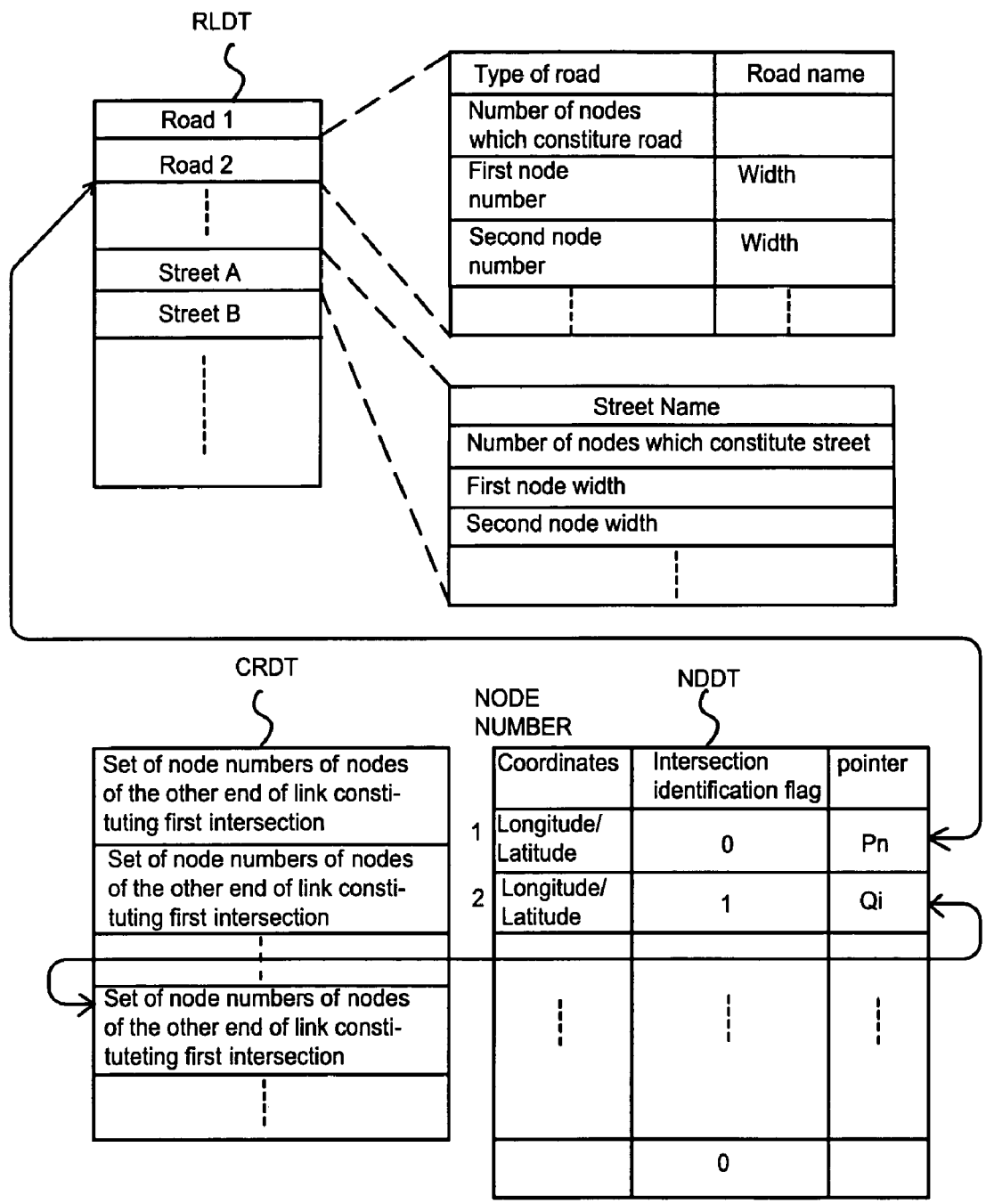
FIG. 5 illustrates an example of road layers or road function classes in the map database for selectively changing the contrasts of the representations on the screen of the navigation system.

An example of layered structure of the map information in the map database (data storage medium 31) is shown in FIG. 5. In this example, the map information is composed of (1) road layers, (2) background layers for displaying objects thereon, (3) character layers for displaying characters, such as names of cities, towns, and villages, (4) POI icon layers for displaying POI icons appropriately at predetermined positions of POIs with predetermined color and contrast against the background, and other matters. Of these, as shown in FIG. 5, the road layers have road link data RLDT, node data NDDT, and intersection data CRDT, and are used for guidance route search processing and map matching processing.

The road link data RLDT, which supplies attribute information of a corresponding road, is composed of data such as the number of all the nodes (road segments) in a road link, the number of each node which is a constituent of the road, a road number (road name), and type of road (national road, superhighway, prefecture road, or other type of road and streets). Also, the intersection data CRDT is a set of nodes (referred to as "nodes constituting an intersection") closest to the intersection from among the nodes on the link, which are coupled to the intersection. The node data NDDT is a list of all the nodes (road segments) constituting the road, and is composed of positional information (longitude, latitude) for each node, an intersection identification flag as to whether or not the node is an intersection, a pointer which points to intersection data when the node is an intersection and which points to a road link to which the node belongs when the node is not an intersection, etc.

Figure 6A:
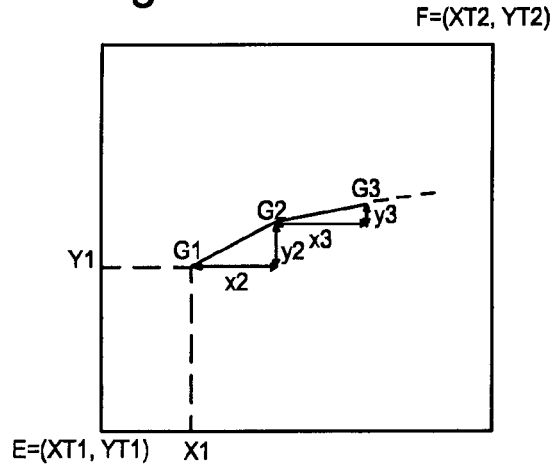
FIGS. 6A and 6B respectively illustrate an example of attribute data and position data in the map database for the representations on the screen of the navigation system where
Figure 6B:
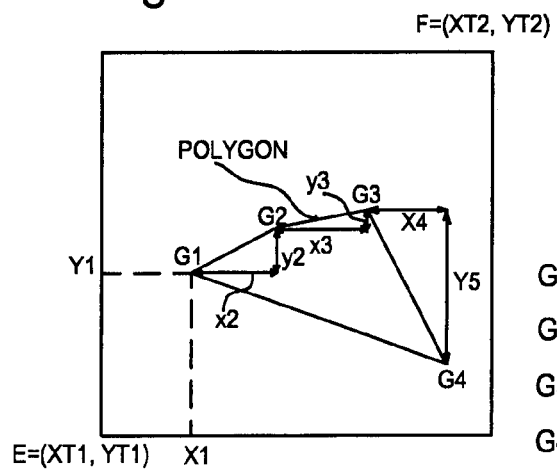

An example of layered data structure of the map information in the map database (data storage medium 31) regarding the background image is shown in FIGS. 6A and 6B. The background layer is divided into units which are further divided into predetermined longitude widths and latitude widths, and has figure data representing plane figures, such as roads, buildings, parks, rivers, lakes, etc., in each unit. As shown in FIGS. 6A and 6B, the range in the absolute longitude and latitude coordinates (X, Y) of each unit is determined by the absolute longitude and latitude coordinates (XT1, YT1) and (XT2, YT2) of diagonal vertexes E and F.

In FIGS. 6A and 6B, the data of each unit contains (1) attributes, such as a type of primitive, i.e., a line or a polygon, color, and a type of line, and (2) in the case of a line, transition points, for example, a longitude/latitude coordinate sequence (x1, y1), (x2, y2), ..., (xn, yn) of each of the element points G1 to Gn, and in the case of a polygon, the presence or absence of fill-in, and vertexes, for example, a longitude/latitude coordinate sequence (x1, y1), (x2, y2), ..., (xn, yn) of each of the element points G1 to Gn. Also, in the case of a polygon, the data contains data indicating the category (hotels, restaurants, airports, stations, shopping centers, sports facilities, hospitals, golf courses, etc.) of buildings and facilities represented by the polygons.

Figures 7A, 7B:
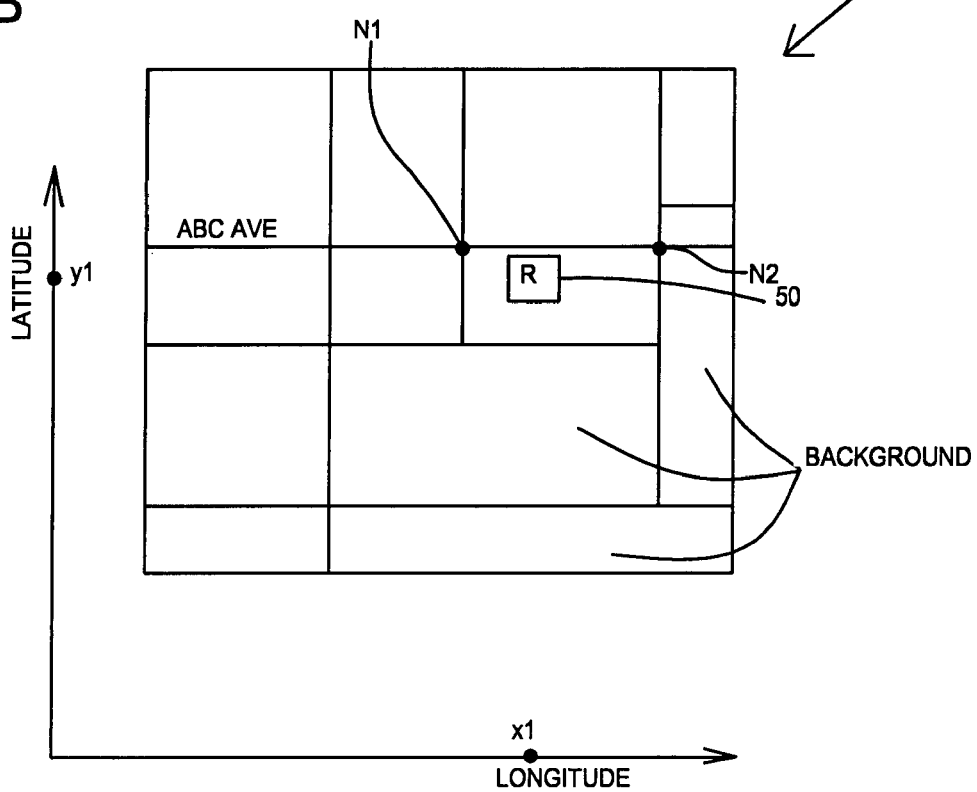
FIG. 7 illustrates an example of POI data in the map database for the representations of the POI icons on the screen of the navigation system.

An example of layered data structure of the map information in the map database (data storage medium 31) regarding the POI is shown in FIGS. 7A and 7B. The POI icon layer is divided according to each unit, and POI icon data shown in FIG. 7A is stored for each POI unit. The POI icon data has:

(1) Longitude and latitude positions of a POI,
(2) POI icon code including color code to be displayed,
(3) Name of road the POI faces,
(4) Link-constituting nodes of road link in which the POI is present,
(5) Category of the POI, and
(6) Name of the POI.

In the example of FIG. 7A, a POI icon 50 is displayed along ABC Avenue at a predetermined position on a map at which BBB restaurant is located, as shown in FIG. 7B.

The POI database memory 35 (FIG. 4) stores therein the data regarding a large number of POIs corresponding to various categories, and furthermore, stores the addresses of POIs, telephone numbers, longitude and latitude positions, categories, information specific to POIs, etc., corresponding to each POI. FIGS. 8A-8C illustrate an example of layered structure of the POI data in the map database for the representations of the POI icons on the screen of the navigation system. FIG. 8A shows a category list, FIG. 8B shows a POI list of restaurants in the restaurant category, and FIG. 8C shows a list of detailed information regarding the BBB restaurant as POIs in the restaurant category.

The POI icons are displayed on the screen under the control of the map icon display controller 47, which adjusts the contrast of the icons against the background of the map image based on the attribute data described above. The map icon display controller 47 is designed to change the contrast or color of the icons based on a program for evaluating the representation contrast against the background when it is necessary.

Figure 9:
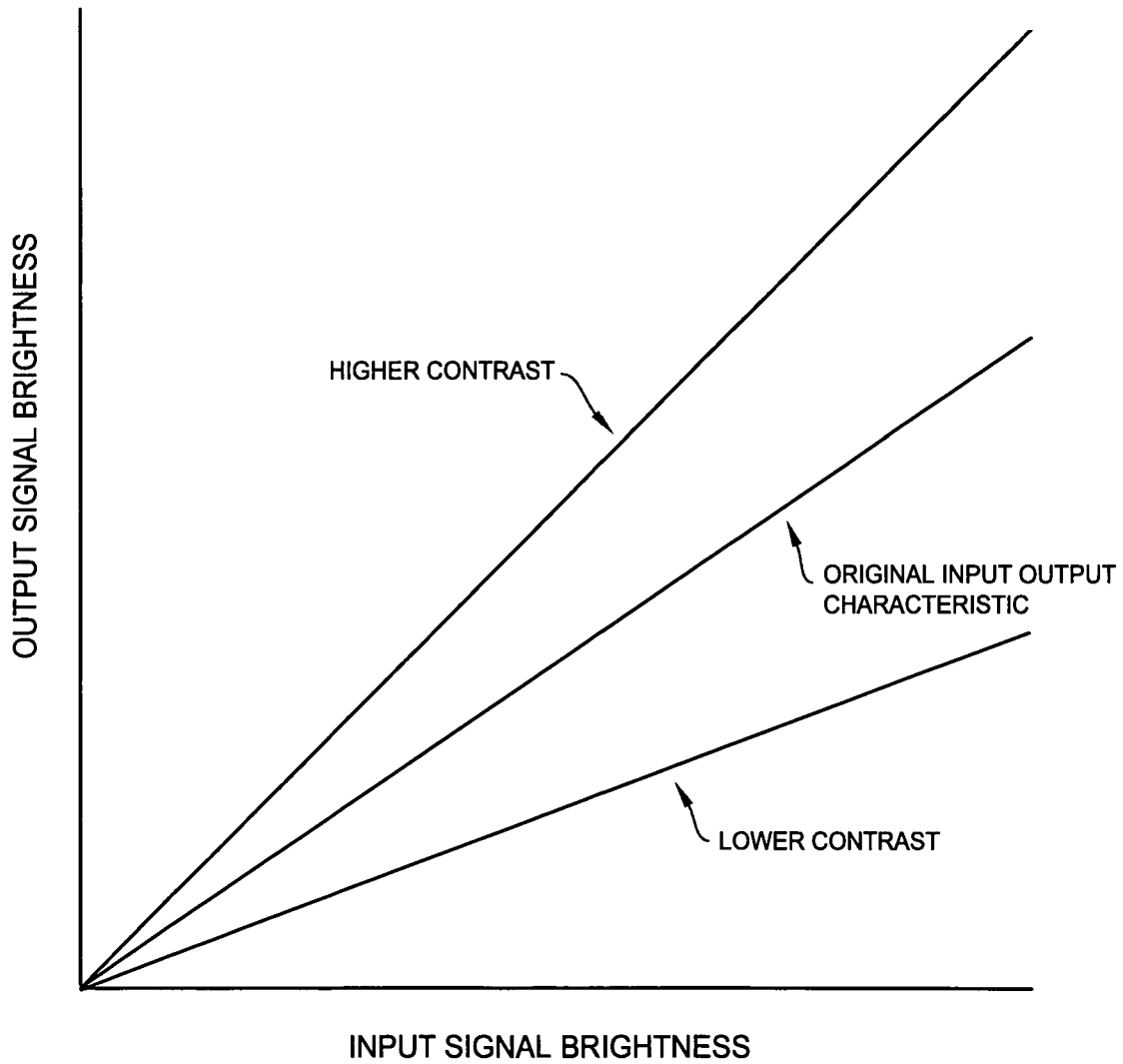
FIG. 9 illustrates an example of input and output characteristic of the map data concerning the brightness for explaining the operation of the present invention for adjusting the contrast.

FIG. 9 illustrates an input/output characteristic of the representation (map icon) brightness or contrast. In the context of the present invention, the contrast of representation denotes the difference of brightness between the icons and the background on a screen. Here, the icons include POI icons, traffic icons, representations of buildings, bridges, towers, mountains, and other landmarks. The background denotes an image plane located in the most backward on a screen on which streets, roads and POI icons are superimposed as shown in FIG. 7B.

In the ordinary operation, map icon data stored in the POI database memory is displayed on the monitor 50 based on the input/output characteristic drawn in a straight line designated by "ORIGINAL INPUT OUTPUT CHARACTERISTIC" in FIG. 9 without any adjustment by the map icon display controller 47. Thus, the brightness of the output data is the same as that of the input data. Namely, the map icon data stored in the POI database is displayed based on the attribute data as show in FIGS. 6A and 6B which include the type of line and color including contrast information.

When displaying the selected icons with higher contrast, the map icon data stored in the POI database memory is adjusted according to the input/output characteristic of "HIGHER CONTRAST" illustrated in FIG. 9. The higher contrast in the context of the present invention means that the slope of the input/output characteristic becomes steeper. Thus, the brightness level of the output data is higher than that of the input data. Namely, the attribute data illustrated in FIGS. 6A and 6B, which includes contrast data or color data against the background, is converted to output signal brightness according to the "HIGHER CONTRAST" characteristic shown in FIG. 9.

On the other hand, when displaying the selected icons with lower contrast, the map icon data stored in the POI database memory is adjusted according to the input/output characteristic of "LOWER CONTRAST" illustrated in FIG. 9. The lower contrast in the context of the present invention means that the slope of the input/output characteristic becomes gradual or gentle. Thus, the brightness level of the output data is lower than that of the input data. Namely, the attribute data illustrated in FIGS. 6A and 6B, which includes contrast data or color data against the background, is converted to output signal brightness according to the "LOWER CONTRAST" characteristic illustrated in FIG. 9.

In the foregoing example, the attribute data associated with road link is explained. Other representations, such as building footprint, landmark icons, POI icons and one-way icons have the same type of attribute data in the POI data base memory 35 so that the representation contrast against the background can be changed.

Figure 10:
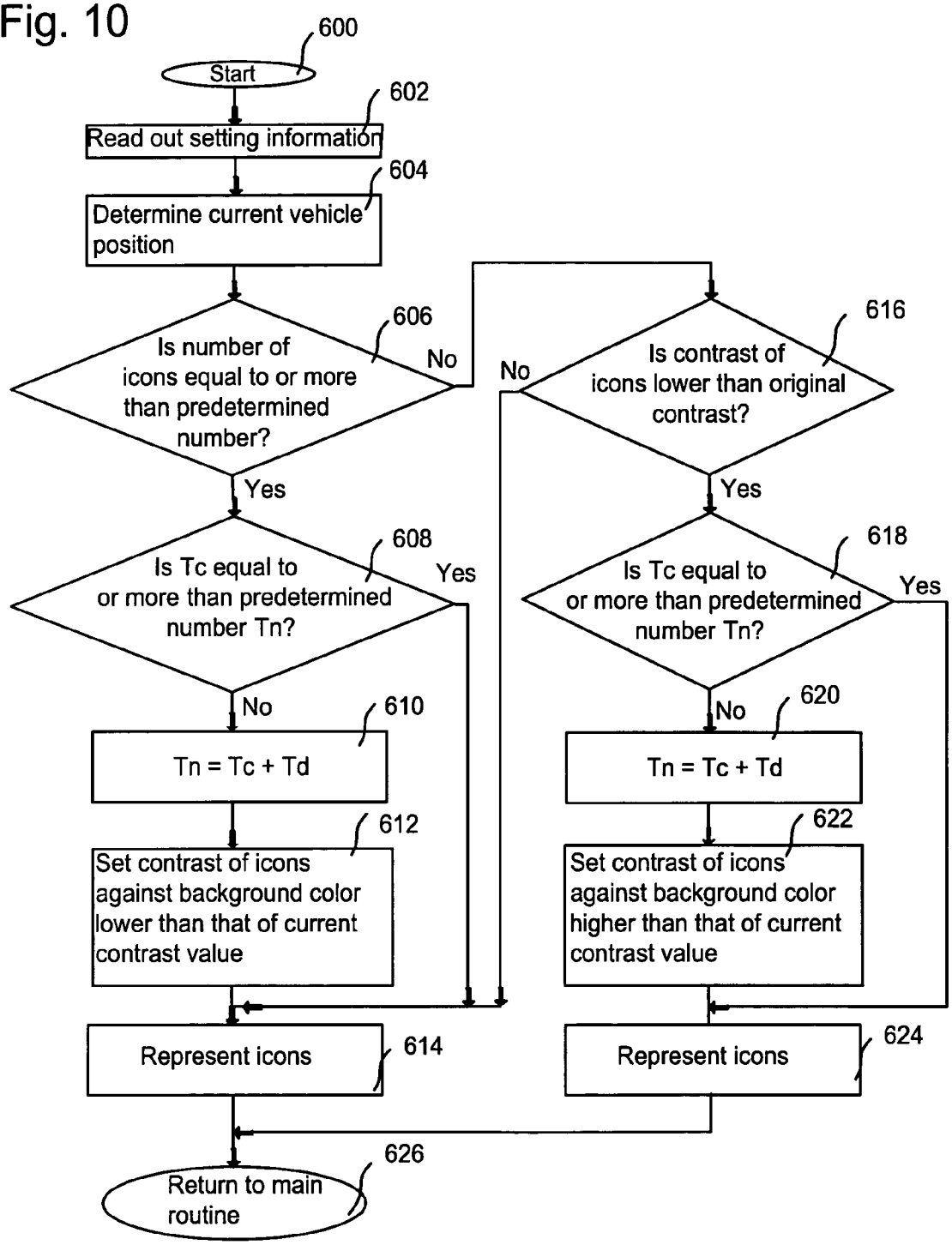
FIG. 10 is a flow chart showing an example of operation of the present invention for evaluating and adjusting the contrasts of the representation against the background of the screen.
Figure 12A:
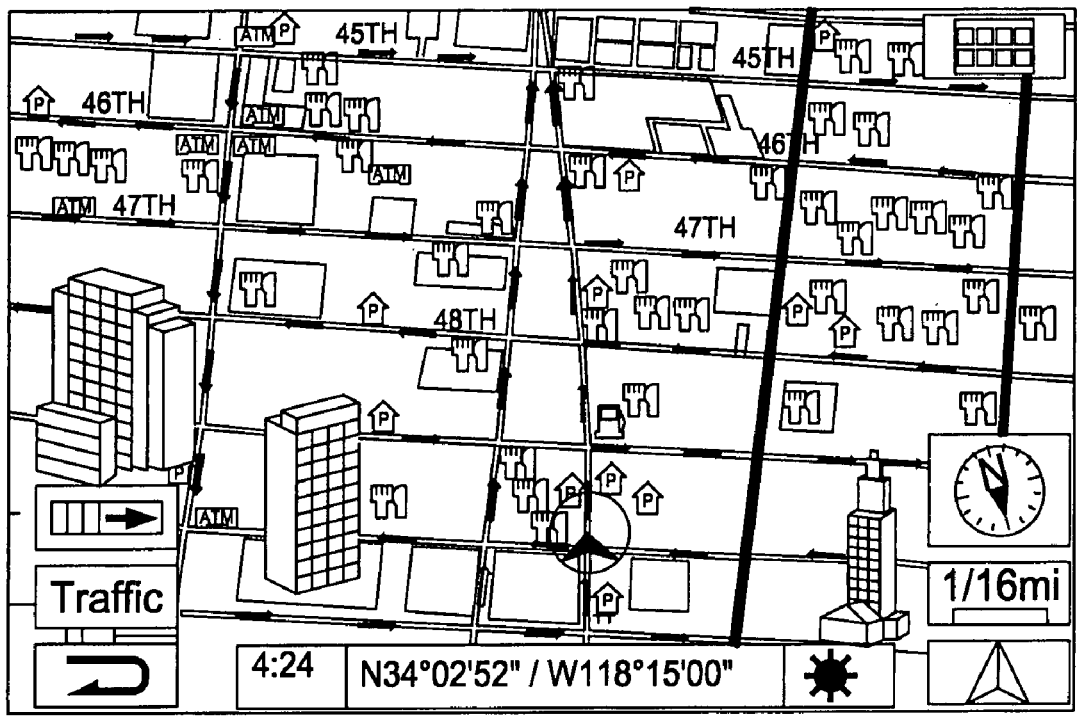
FIGS. 12A and 12B illustrate an example of map image on the screen of the navigation system for the urban or congested area to show the effects of the present invention where

FIG. 10 is a flow chart showing an example of operation of the present invention for evaluating and adjusting the representation contrast against the background on the monitor screen of the navigation apparatus. This example shows the situation where the present invention is applied to the map image showing a congested area such as a downtown of a city. The contrast ratio between icons, such as building footprints, landmark icons, POI icons and one-way icons against the background layer and the road layers shown in FIG. 12A is adjusted in response to the total number the icons to be displayed on the screen.

In this embodiment, when there are total of fifty (50) or more icons on the screen, the maximum contrast ratio between the brightest icon and background is set lower, for example from 100:1 to 30:1. The contrast of all icons against the background is set so that the contrast of all icons falls within the maximum contrast ratio. As a result, the current position marks, the destination mark and road networks become more visible even in the congested area where lots of map icons are displayed on the screen without loosing the information from the screen.

In the flow chart of FIG. 10, the map icon display controller 47 starts the process at step 600 and reads out setting information for displaying map icons based on the user settings in step 602. Then, in step 604, the current vehicle position is determined based on the data from the position measuring device 33 to write the latest map data for displaying map information in a VRAM (video random access memory) 44. The map icon display controller 47 determines whether the number of icons is equal to or more than a predetermined number (in this embodiment, the predetermined number is 50) in step 606.

When the number of icons is 50 or more, at step 612, the contrast of the icons against the background is set lower than that of a current contrast value. Since the sudden contrast change may surprise the user, preferably, the map icon display controller 47 is designed to provide a few steps to gradually change the contrast. In this embodiment, this step control is achieved by adding a decremental time Td until the control time Tc reaches to the predetermined time constant Tn at steps 608 and 610.

When the number of icons displayed on the screen is less than the predetermined number, the map icon display controller 47 determines whether the contrast of the icons has been once set lower than the original contrast in step 616. When this is the case, the contrast of icons resumes to the original contrast through a step-by-step manner, i.e, incrementally, in steps 618, 620 and 622. As noted above, since the sudden contrast change may surprise the user, the map icon display controller 47 is designed to provide a step-by-step operation to gradually change the contrast. In this embodiment, the step control is conducted by adding an incremental time Td until the control time Tc reaches to the predetermined time constant Tn in steps 616 and 614 which are similar to the operations as the steps from 608 to 610 noted above. When the map icon display controller 47 determines that the contrast of the icons has not been set lower, the same contrast is kept until the other case occurs in steps 616 and 614.

Figure 12B:
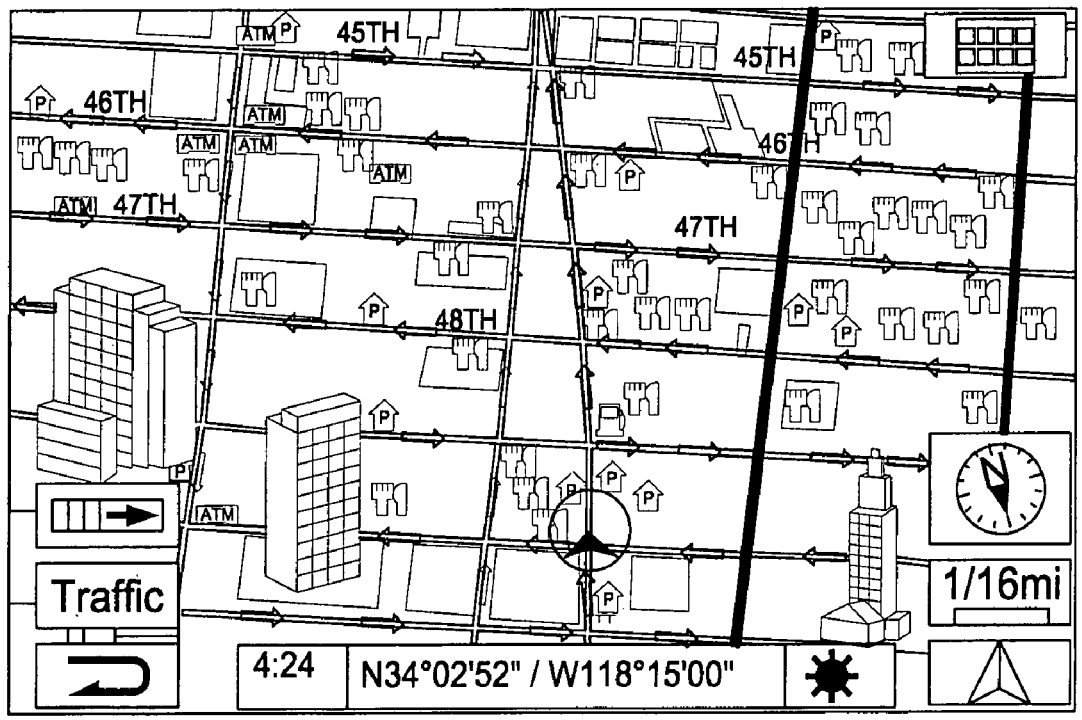

FIGS. 12A and 12B illustrate examples of map image on the screen of the navigation system for the urban or congested area to show the effects of adjusting the contrast (brightness) of the icons against the background according to the present invention. FIG. 12A shows the map image before applying the contrast adjustment operation and FIG. 12B shows the map image after applying the contrast adjustment operation. Namely, FIGS. 12A and 12B show the difference between the screen displayed before applying the contrast adjustment described above and the screen displayed after applying the contrast adjustment.

In FIG. 12B, since the drawings are illustrated in black and white, in order to express the contrast change, the width of line illustrating the icons is changed so that the lines having a larger width denote the higher contrast against the background and the lines having a smaller width denote the lower contrast against the background for demonstration purpose. Namely, a thinner line is used for the icons to express the lower contrast ratio between icons and the background on the screen. As shown in FIGS. 12A and 12B, the current position mark, current road on which the vehicle is running, and road networks are more visible and can be easily recognizable after applying the contrast adjustment operation described above.

Figure 11:
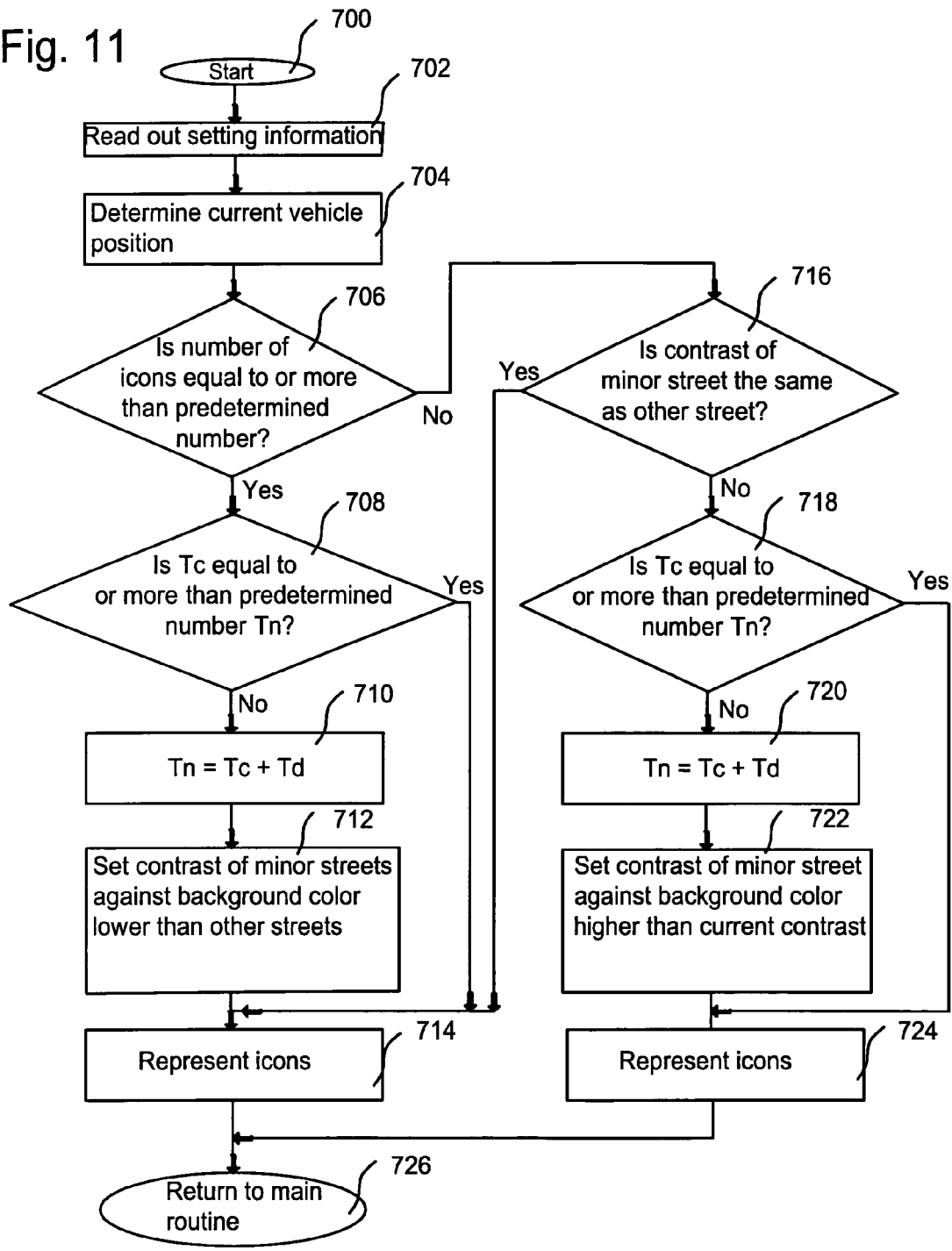
FIG. 11 is a flow chart showing another example of operation of the present invention for evaluating and adjusting the contrasts of the representation against the background of the screen.

FIG. 11 illustrates a flow chart showing an example of operation of the present invention for evaluating and adjusting the representation contrast against the background on the monitor screen of the navigation apparatus. This example shows the situation where the present invention is applied to the map image showing an open area or less congested area. As described previously, since the same function class of road is displayed in the same map scale, the user may not recognize minor streets in the open area. Thus, the present invention provides various contrasts of streets against background color depending on the number of icons displayed on the screen to make minor streets more visible in such an open or less congested area.

In the flow chart of FIG. 11, the map icon display controller 47 starts the process at step 700 and reads out setting information for displaying map icons based on the user settings in step 702. Then, the current vehicle position is determined based on the data from the position measuring device 33 to set the latest map data for displaying the latest map information in the VRAM 44 at step 704. The map icon display controller 47 determines whether the number of icons is equal to or more than a predetermined number (in this embodiment, the predetermined number is 50) in step 706.

When the number of icons is 50 or more, the contrast of minor streets against the background is set lower than that of the current contrast value to be lower than other streets at step 712. Since the sudden contrast change may surprise the user, the map icon display controller 47 is designed to provide a few steps to gradually change the contrast depending on the number of icons displayed on the screen by adding a decremental time Td until the control time Tc reaches to the predetermined time constant Tn at steps 708 and 710. Tn this embodiment, this step-by-step control is done by adding the decremental time Td until the control time Tc reaches to the predetermined time constant Tn.

When the number of icons displayed on the screen is less than the predetermined number, for example 50, the map icon display controller 47 determines whether the contrast of the minor street is less than the other street in step 716. When this is the case, it means that map image on the screen is the one that show a rural area or less congested area. Therefore, the navigation system will increase the contrast of icons to the original contrast through a few steps by increasing the contrast of the minor street against the background in steps 718, 720 and 722.

Since the sudden contrast change may surprise the user, the map icon display controller 47 is designed to provide a few steps to gradually change the contrast. In this embodiment, this step-by-step control is performed by adding an incremental time Td until the control time Tc reaches to the predetermined time constant Tn at steps 718 and 720 which is similar to operations in the steps of 708 and 710 noted above. When the map icon display controller 47 determines that the contrast of the minor street is the same contrast ratio as the other street, the same contrast is kept until the other case occurs in steps 716 and 714.

Figure 13A:
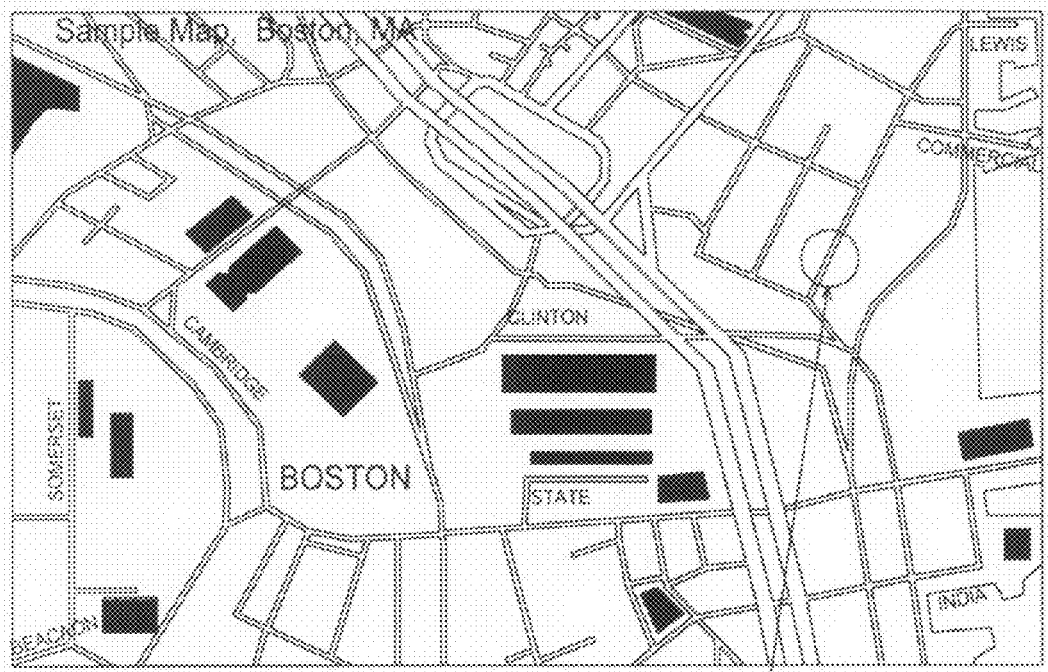
FIGS. 13A and 13B illustrate an example of map image on the screen of the navigation system for the open or less congested area to show the effects of the present invention where
Figure 13B:
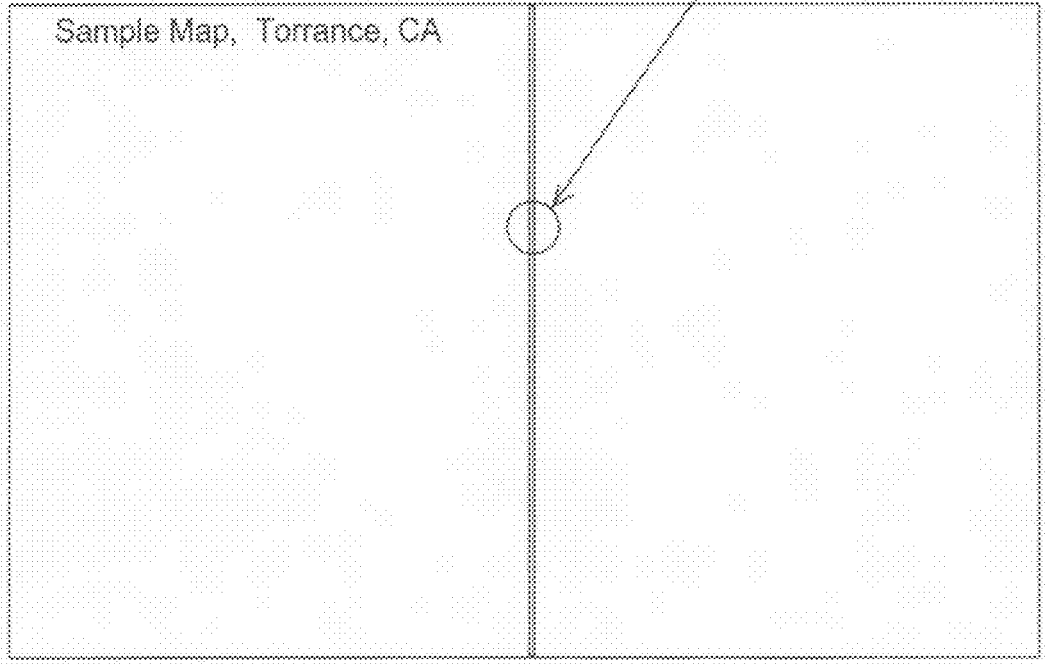

FIGS. 13A and 13B illustrate examples of map image on the screen of the navigation system for the local or less congested area to show the effects of adjusting the contrast (brightness) of the icons against the background according to the present invention. FIG. 13A shows the map image before applying the contrast adjustment operation and FIG. 13B shows the map image after applying the contrast adjustment operation. Namely, FIGS. 13A and 13B show the difference between the screen displayed before applying the contrast adjustment described above and the screen displayed after applying the contrast adjustment.

In FIG. 13B, since the drawings are illustrated in black and white, in order to express the contrast change, the width of line illustrating the icons is changed so that the lines having a larger width denote the higher contrast against the background and the lines having a smaller width denote the lower contrast against the background for demonstration purpose. Namely, a thicker line is used for the icons to express the higher contrast ratio between icons and the background on the screen. As shown in FIGS. 13A and 13B, the minor street displayed in the less congested area is displayed more brightly so that it becomes more visible and can be easily recognizable.

In these embodiments described above, contrast has been changed while keeping the same color series. However, the contrast can be changed by changing color series as long as the contrast of the color is changed. Also, the contrast has been changed in a step wise in these embodiments described above. However, the contrast can be continuously changed in proportion to the number of icons on a screen.

As has been described above, according to the present invention, the navigation system evaluates the representations of map elements and adjusts the contrast of the representations based on various factors. Thus, the navigation system allows a user to more easily and accurately identify the actual locations of the map elements, such as a destination, road networks, road level, etc., in a congested area by adjusting the representation contrast. Accordingly, the navigation system is able to provide various contrast of icons, such as building footprints, landmark icons, POI icons, one-way icons and roads, against the background color on the screen. Further, it becomes possible to make the minor streets more visible in an open or less congested area by adjusting the contrast of the minor street against the background on the screen of the navigation system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for evaluating and adjusting contrast of representations on a screen of a navigation system, comprising the following steps of:
   counting a number of selected representations displayed on a background of the screen by a CPU of the navigation system;
   adjusting the contrast of brightness of the selected representations against the background displayed on the screen in response to the number of the selected representation on the screen by a display controller of the navigation system; and
   displaying the selected representations on the screen based on the adjusted contrast;
   wherein adjusting the contrast of brightness of the selected representations against the background on the screen of the navigation system is performed with a plurality of continuous steps for gradual adjustment of the contrast.

2. The display method for evaluating and adjusting the contrast of representations as defined in claim 1,
   wherein the contrast of the representations against the background is set lower than original contrast of the representations against the background when the number of the representations on the screen is equal to or larger than a predetermined number.

3. The display method for evaluating and adjusting the contrast of representations as defined in claim 2,
   wherein the contrast of representations against the background is changed in a step-by-step manner by decrementally changing the contrast of the selected representations in response to the number of the selected representations.

4. The display method for evaluating and adjusting the contrast of representations as defined in claim 1,
   wherein the contrast of the representations against the background is set higher than current contrast of the representations against the background when the number of the representations on the screen is smaller than a predetermined number.

5. The display method for evaluating and adjusting the contrast of representations as defined in claim 4,
   wherein the contrast of representations against the background is changed in a step-by-step manner by incrementally changing the contrast of the selected representations in response to the number of the selected representations.

6. The display method for evaluating and adjusting the contrast of representations as defined in claim 1,
   wherein the representations include a first street and a second street on the background displayed on the screen of the navigation system, and
   wherein the contrast of the first street against the background is adjusted to contrast lower than contrast of the second street against the background when the number of the representations in the screen is equal to or larger than a predetermined number.

7. The display method for evaluating and adjusting the contrast of representations as defined in claim 6,
   wherein the contrast of the first street against the background is changed in a step-by-step manner by decrementally changing the contrast of the first street in response to the number of the selected representations.

8. The display method for evaluating and adjusting the contrast of representations as defined in claim 1,
   wherein the representations include a first street and a second street on the background displayed on the screen of the navigation system, and
   wherein the contrast of the first street against the background is adjusted to contrast identical to contrast of the second street against the background when the number of the representations in the screen is less than a predetermined number.

9. The display method for evaluating and adjusting the contrast of representations as defined in claim 8,
   wherein the contrast of the first street against the background is changed in a step-by-step manner by incrementally or decrementally changing the contrast of the first street in response to the number of the selected representations.

10. The display method for evaluating and adjusting the contrast of representations as defined in claim 1,
    wherein the first street is a street having narrower width than that of the second street.

11. A display apparatus for evaluating and adjusting contrast of representations on a screen of a navigation system, comprising:
    means for counting a number of selected representations displayed on a background of the screen;
    means for adjusting the contrast of brightness of the selected representations against the background displayed on the screen in response to the number of the selected representation on the screen; and
    means for displaying the selected representations on the screen based on the adjusted contrast;
    wherein adjusting the contrast of brightness of the selected representations against the background on the screen of the navigation system is performed with a plurality of continuous steps for gradual adjustment of the contrast.

12. The display apparatus for evaluating and adjusting the contrast of representations as defined in claim 11,
    wherein the contrast of the representations against the background is set lower than original contrast of the representations against the background when the number of the representations on the screen is equal to or larger than a predetermined number.

13. The display apparatus for evaluating and adjusting the contrast of representations as defined in claim 12,
    wherein the contrast of representations against the background is changed in a step-by-step manner by decrementally changing the contrast of the selected representations in response to the number of the selected representations.

14. The display apparatus for evaluating and adjusting the contrast of representations as defined in claim 11,
    wherein the contrast of the representations against the background is set higher than current contrast of the representations against the background when the number of the representations on the screen is smaller than a predetermined number.

15. The display apparatus for evaluating and adjusting the contrast of representations as defined in claim 14,
    wherein the contrast of representations against the background is changed in a step-by-step manner by incrementally changing the contrast of the selected representations in response to the number of the selected representations.

16. The display apparatus for evaluating and adjusting the contrast of representations as defined in claim 11,
    wherein the representations include a first street and a second street on the background displayed on the screen of the navigation system, and wherein the contrast of the first street against the background is adjusted to contrast lower than contrast of the second street against the background when the number of the representations in the screen is equal to or larger than a predetermined number.

17. The display apparatus for evaluating and adjusting the contrast of representations as defined in claim 16, wherein the contrast of the first street against the background is changed in a step-by-step manner by decrementally changing the contrast of the first street in response to the number of the selected representations.

18. The display apparatus for evaluating and adjusting the contrast of representations as defined in claim 11, wherein the representations include a first street and a second street on the background displayed on the screen of the navigation system, and wherein the contrast of the first street against the background is adjusted to contrast identical to contrast of the second street against the background when the number of the representations in the screen is less than a predetermined number.

19. The display apparatus for evaluating and adjusting the contrast of representations as defined in claim 18, wherein the contrast of the first street against the background is changed in a step-by-step manner by incrementally or decrementally changing the contrast of the first street in response to the number of the selected representations.

20. The display apparatus for evaluating and adjusting the contrast of representations as defined in claim 11, wherein the first street is a street having narrower width than that of the second street.

* * * * *